(12) United States Patent
Yamamoto et al.

(10) Patent No.: US 7,482,588 B2
(45) Date of Patent: Jan. 27, 2009

(54) METHOD OF CALCULATING RADIATION

(75) Inventors: Kenji Yamamoto, Hitachinaka (JP); Osamu Itou, Hitachiota (JP); Masayuki Taniguchi, Hitachinaka (JP); Hirofumi Okazaki, Hitachinaka (JP); Taro Sakata, Yasuura (JP)

(73) Assignees: Hitachi, Ltd., Tokyo (JP); Babcock-Hitachi Kabushiki Kaisha, Tokyo (JP)

( * ) Notice: Subject to any disclaimer, the term of this patent is extended or adjusted under 35 U.S.C. 154(b) by 1353 days.

(21) Appl. No.: 10/390,695

(22) Filed: Mar. 19, 2003

(65) Prior Publication Data

US 2003/0182338 A1 Sep. 25, 2003

(30) Foreign Application Priority Data

Mar. 25, 2002 (JP) ............................. 2002-082437

(51) Int. Cl.
*G01T 1/16* (2006.01)
(52) U.S. Cl. .................................................. 250/336.1
(58) Field of Classification Search ............... 250/336.1
See application file for complete search history.

(56) References Cited

U.S. PATENT DOCUMENTS 6,148,272 A * 11/2000 Bergstrom et al. .......... 702/179
6,335,792 B1 * 1/2002 Tsuchiya .................... 356/432

FOREIGN PATENT DOCUMENTS

EP 0 987 618 A1 3/2000

JP 8-221386 8/1996

OTHER PUBLICATIONS

Marsha J. Berger et al. "Automatic Adaptive Grid Refinement for the Euler Equation" (AIAA Journal vol. 23, No. 4, Apr. 1985, pp. 561-568).
T. Omori et al. "Radiation Analysis of Three-dimensional Arbitrarily Shaped Enclosure" (Tokyo Gas Energy Research Laboratory Technical Report No. 5, 1995, pp. 115-124).

* cited by examiner

*Primary Examiner*—David P Porta
*Assistant Examiner*—Marcus H Taningco
(74) *Attorney, Agent, or Firm*—Dickstein Shapiro LLP

(57) ABSTRACT

Conventionally, a coarse mesh having a same size in that a calculation cell was used regardless to whether the location is near or remote from radiation elements such as calculation cells and wall face elements. Therefore, it took very long calculation time to calculate an energy exchange between a remote location covered by a coarse mesh and a noted cell. Further, there were many non-influential cells for calculation in a location remote from a noted radiation element for radiation calculation, the calculation accuracy was low. The present invention is to propose a method of calculating radiation which is provided with a measure for completing the calculation rapidly while keeping calculation accuracy high.

In that, near at a calculation cell from which radiation energy is emitted or at a calculation cell P into which radiation energy is absorbed, a small (level 0) cell is used and at a remote location from the calculation cell P, a large (level n) cell formed by combining plural small cells is used. Further, a largest calculation cell which comes into field of view angle $\Delta\Omega$ covered by a ray is selected. As a result, the accuracy of the radiation calculation is enhanced, the calculation time is shortened and amount of memory necessary for the calculation can be reduced.

10 Claims, 11 Drawing Sheets

RAY DATABASE PREPARATION ALGORISM

RADIATION TRANSPORT CALCULATION METHOD

RAY DATABASE PREPARATION ALOGRISM

RADIATION TRANSPORT CALCULATION METHOD

HEAT ABSORPTION DISTRIBUTION

CONVENTIONAL METHOD
( 36 RAYS )

HEAT ABSORPTION DISTRIBUTION

PRESENT INVENTION METHOD
( 36 RAYS )

PRESENT INVENTION METHOD
(16 RAYS)

NUMBER OF RAY ELEMENTS ($\times 10^6$)

| | LEVEL 0 | LEVEL 1 | LEVEL 2 | LEVEL 3 | TOTAL |
|---|---|---|---|---|---|
| DT METHOD (36RAYS) | 8.80 | 0 | 0 | 0 | 8.80 |
| PRESENT INVENTION (36RAYS) | 4.99 | 1.13 | 0.31 | 0.02 | 6.47 |
| PRESENT INVENTION (16RAYS) | 1.29 | 0.42 | 0.22 | 0.11 | 2.06 |

METHOD OF CALCULATING RADIATION

BACKGROUND OF THE INVENTION

1. Field of the Invention

The present invention relates to a method of calculating radiation and, in particular, relates to a method for calculating accurately and rapidly the distribution and intensity of radiation from a variety of energy sources irradiating radiation such as a thermal power plant, a nuclear fusion reactor, an engine, a fire and a bonfire, a recording medium therefor and a computer therefor.

2. Convention Art

As a device for analyzing flow and radiation field in a region where exoergic or convection occurs, a radiation flow analysis device as disclosed in JP-A-8-221386 (1996) was known.

In the above conventional art, the radiation and flow analysis is performed in such a manner that a mesh having high density is applied on a part of the region to be noted and on the other region a mesh having uniformly coarse density is applied so as to reduce calculation steps and calculation time therefor.

Radiation calculation methods such as DT (Discrete Transfer) method, ray tracing method, Monte Carlo method and zone method perform calculation of radiation energy exchange by causing to emit rays or photons from radiation elements such as calculation cells and wall face elements into or out of which radiation energy makes incident or irradiates.

Although, as in the above conventional example, the radiation flow analysis in some cases were performed by applying a mesh having a high density with regard to a part of the region to be noted, however, with regard to the other region a coarse mesh having the same size, in that a calculation cell was used regardless to whether the location is near or remote from the calculation cells and the wall face elements.

Therefore, it takes very long calculation time to calculate an energy exchange between a remote location covered by a coarse mesh and a noted cell.

Further, in the conventional radiation calculation method, since there were many non-influential cells for calculation in a location remote from a noted radiation element for radiation calculation, the calculation accuracy was low.

SUMMARY OF THE INVENTION

An object of the present invention is to propose method of calculating radiation which is provided with a measure for completing the calculation rapidly while keeping calculation accuracy high.

In order to achieve the above object, the present invention, proposes a method of calculating radiation in which a field where movement of radiation energy is caused is divided into plural radiation elements for numerical calculation use such as a space cell, a wall element and a boundary element and every exchange between the plural radiation elements is calculated, wherein a single radiation element is formed by joining the plural divided radiation elements and the joint number of the radiation elements is more limited as the location comes near to the radiation elements where the radiation energy makes incident.

The present invention, further, proposes a method of calculating radiation in which a field where movement of radiation energy is caused is divided into plural radiation elements for numerical calculation use such as a space cell, a wall element and a boundary element and every exchange between the plural radiation elements is calculated by making use of the plural radiations (rays) emitted from the respective radiation elements or plural radiations (rays) absorbed by the respective radiation elements, wherein a single radiation element is formed by joining the plural divided radiation elements and the joint number of the radiation elements is more limited as the location comes near to the radiation elements where the radiation energy makes incident.

The present invention, further, proposes a method of calculating radiation in which a field where movement of radiation energy is caused is divided into plural radiation elements for numerical calculation use such as a space cell, a wall element and a boundary element and the radiation energy exchange between the plural radiation elements is calculated by making use of the plural radiations (rays) emitted from the respective radiation elements or plural radiations (rays) absorbed by the respective radiation elements, wherein a single radiation element is formed by joining the plural divided radiation elements and the joint number thereof is determined depending on a relationship between a region of field of view angle covered by the radiation (ray), location of the radiation elements and the size thereof.

The present invention, further, proposes a method of calculating radiation in which a field where movement of radiation energy is caused is divided into plural radiation elements for numerical calculation use such as a space cell, a wall element and a boundary element and every exchange between the plural radiation elements is calculated, as well as radiation heat exchanging amount is calculated based on heat exchanging areas between the respective radiation elements, wherein a single radiation element is formed by joining the plural divided radiation elements and the joint number of the radiation elements is more limited as the location comes near to the radiation elements where the radiation energy makes incident.

The present invention, further, proposes a method of calculating radiation in which a field where movement of radiation energy is caused is divided into plural radiation elements for numerical calculation use such as a space cell, a wall element and a boundary element and every exchange between the plural radiation elements is calculated, as well as radiation heat exchanging amount is calculated based on heat exchanging areas between the respective radiation elements, wherein a single radiation element is formed by joining the plural divided radiation elements and the joint number thereof is determined depending on a relationship between a region of field of view angle covered by the radiation (ray), location of the radiation elements and the size thereof.

The present invention, further, proposes a method of calculating radiation, wherein the joint number is selected of the largest radiation element which comes in the field of view angle covered by the radiation (ray).

The present invention, further, proposes a method of calculating radiation, wherein the joint number of the radiation elements is determined so that the radiation elements through which the radiations (rays) pass cover the entire regions.

The present invention, further, proposes a method of calculating radiation according to any one of the above radiation calculation methods, wherein the cells are joined in the number of $2^n$ (n is an integer) in one calculation direction.

The present invention proposes a method of calculating radiation, wherein DT method, ray tracing method, Monte Carlo method or zone method is used for the radiation calculation method.

The present invention, further, proposes a recording medium storing a program of calculating radiation in which a field where movement of radiation energy is caused is divided into plural radiation elements for numerical calculation use such as a space cell, a wall element and a boundary element and the radiation energy exchange between the plural radiation elements is performed, wherein the recording medium stores a calculation program incorporating an algorism in which a single radiation element is formed by joining the plural divided radiation elements and the joint number for the radiation elements is more limited as the location comes near to the radiation elements where the radiation energy makes incident in view of the radiation energy exchange.

The present invention, further, proposes a computer which executes a program of calculating radiation in which a field where movement of radiation energy is caused is divided into plural radiation elements for numerical calculation use such as a space cell, a wall element and a boundary element and the radiation energy exchange between the plural radiation elements is performed, wherein the computer executes a calculation program incorporating an algorism in which a single radiation element is formed by joining the plural divided radiation elements and the joint number for the radiation elements is more limited as the location comes near to the radiation elements where the radiation energy makes incident in view of the radiation energy exchange.

The above or lately referred to DT method, ray tracing method, zone method, Monte Carlo method and multigrid method imply as follows.

(1) DT Method

The method is one of radiation calculation methods developed by F. C. Lockwood et al. [1] and is an algorism which permits high speed calculation of absorbed heat amount on a wall face, in which, in order to transport radiation energy, rays are emitted only from wall elements while preventing rays from emitting from space cells, and from the wall elements the emission from the walls and reflected energy therefrom is emitted, when radiation rays pass through calculation cells, a part of the energy of the radiation rays is absorbed by the cells, a part of radiation energy emitted from cells is added to the energy of radiation ray, and the processing is repeated until a heat absorption point is reached. Since the original DT method [1] does not satisfy the energy conservation law, it is preferred to use a modified DT method [2].

[1] F. C. Lockwood and N. G. Shah (18th Symp. (Int) on Combustion, (1981) pp. 1405-1414)

[2] P. J. Coelho and M. G. Carvalho (Transaction of ASME, Vol. 119 (1997), pp. 118-128)

(2) Ray Tracing Method

The method is one of radiation calculation methods in which plural radiation transportation use rays are emitted from respective radiation elements, the radiation energy is transported on the rays, and radiation intensity on the rays at outlets of the respective cells follows Beer's law and is determined based on radiation intensity at inlets, passage length and absorption coefficient. Although the calculation method strictly follows physical phenomenon, however, takes long calculation time, because rays are required to be emitted from respective cells.

[3] Masashi KATSUKI "Radiant Heat Transfer in Combustion Field and Numerical Analysis" (Journal of Academic Society of High Temperature, Vol. 14, No. 6, 1988)

(3) Zone Method

The method is a calculation method in which space is divided into plural small regions and a temperature which satisfies thermal balance and radiant heat transfer amount in respective small regions is calculated. The calculation time can be shortened, if heat exchange areas representing degree of influence between respective cells are calculated in advance.

(4) Monte Carlo Method

The method is close to the ray tracing method, in which an idea of probability is introduced in a tracing process of radiation energy, for example, emission position, emission direction, absorption position, and reflection direction are determined with probability. Since probability is introduced in the method, complex calculations can be dealt easily, however, in order to enhance accuracy number of radiation energy emission times has to be increased.

(5) Multigrid Method

The method is one of matrix calculation methods. In a usual matrix calculation method, calculation speed of reducing errors of wavelength corresponding to the grid interval is high, however, in order to reduce errors of wavelength longer than the grid interval long calculation time is required. Therefore, a large cell formed by joining a plural number of grids is introduced for the calculation, thereby, calculation time for reducing errors for long wavelength are reduced.

According to the present invention, a radiation calculation method is obtained in which near at a calculation cell from which radiation energy is emitted or at a calculation cell into which radiation energy is absorbed, a small (level 0) cell is used without joint the divided radiation elements and at a remote location from the calculation cell, a large (level n) cell formed by joining plural small cells is used. Further, a largest calculation cell which comes into field of view angle $\Delta\Omega$ covered by a ray is selected. As a result, the accuracy of the radiation calculation is enhanced, the calculation time is shortened and amount of memory necessary for the calculation can be reduced.

DETAILED DESCRIPTION OF THE PREFERRED EMBODIMENTS

Now, embodiments of radiation calculation method according to the present invention will be explained with reference to FIGS. 1 through 15.

Figure 2:
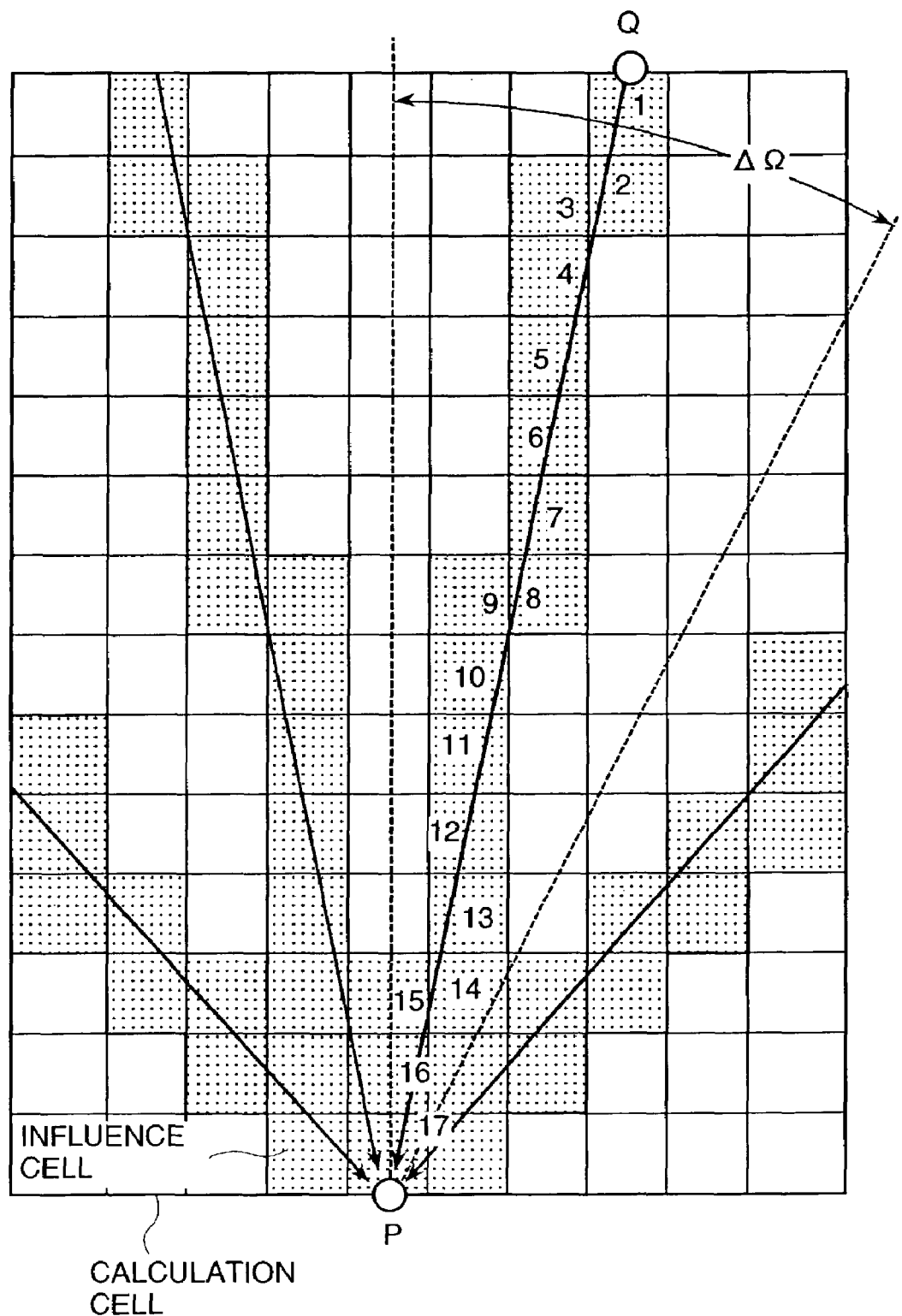
FIG. 2 is a diagram showing a manner of radiation calculation according to the present invention.

FIG. 2 is a diagram showing a radiation calculation according to a conventional DT method. In FIG. 2, radiation elements are illustrated in two dimensional manner, however, the like radiation calculation method can be applied even when in three dimension case. Further, in FIG. 2, an example of calculation in rectangular coordinate system is shown, however, the same is true such as in general coordinate systems and in unstructural grid system. Still further, in other radiation calculation methods such as Monte Carlo method, a similar calculation method can be used if radiation (ray) is emitted from a wall element. Wherein, the radiation (ray) implies a passage through which radiation energy is transported, namely a passage which performs radiation or absorption.

With the conventional DT method as shown in FIG. 2, the radiation energy emitted from point Q reaches point P (calculation cell) passing through 17 pieces of cells. The calculation time therefor is proportional to the number of the passing through cells. In the conventional DT method, in order to calculate the intensity of radiation energy making incident into point P, calculation on the small cells is necessary even at a remote location from point P.

Actually, as the location becomes remote from point P, there appear many non-influential cells between respective rays. From point of physics if there is nothing to interrupt radiation, radiation energy in all regions will reach point P. However, when the number of rays is limited, non-influential regions increase and errors increase.

[Embodiment Mode 1]

Figure 1:
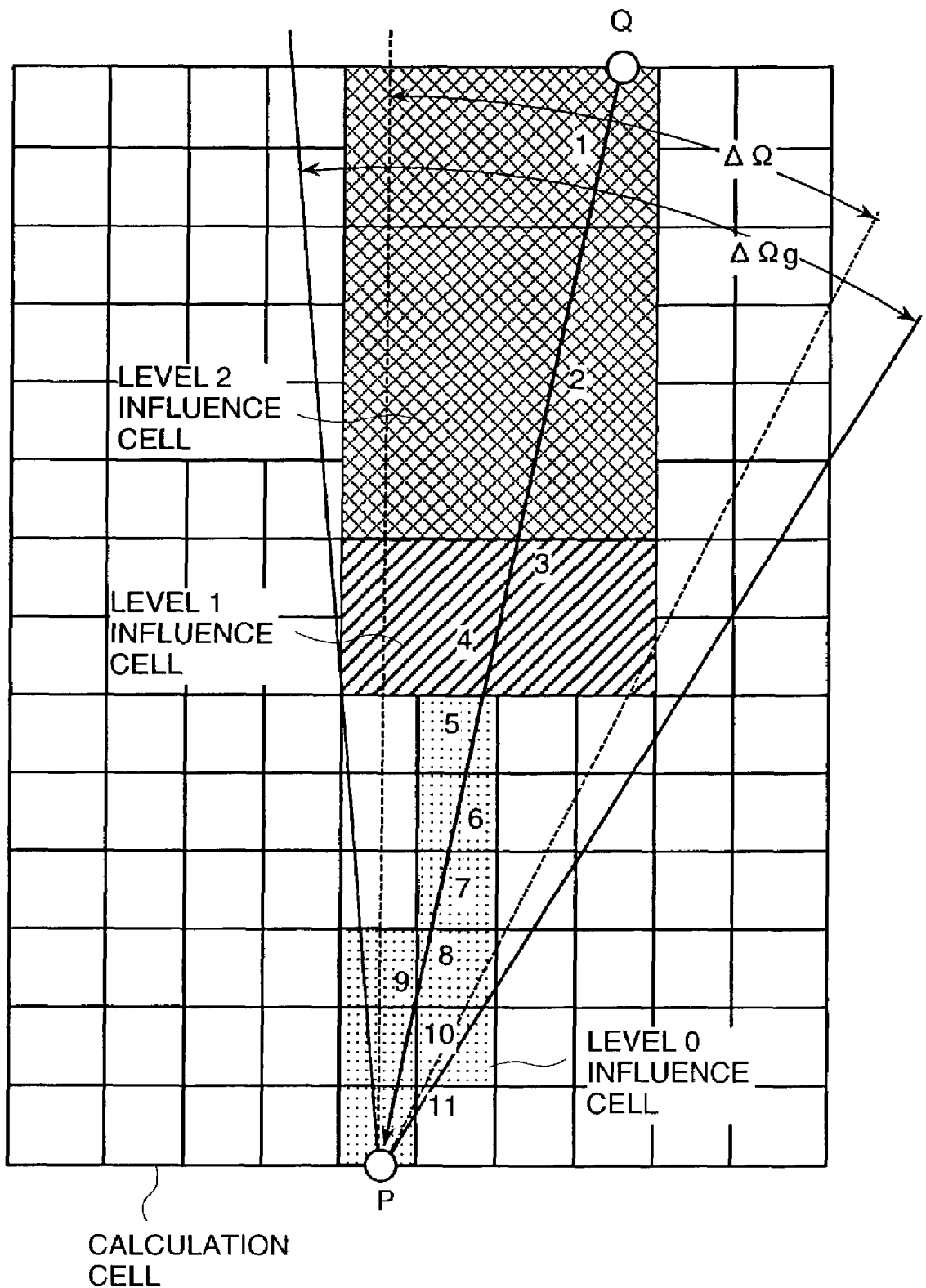
FIG. 1 is a diagram showing a joining manner of radiation elements in an embodiment mode 1 of the radiation calculation method according to the present invention.

FIG. 1 is a diagram showing a joint manner of radiation elements in an embodiment mode 1 of the radiation calculation method according to the present invention. In the embodiment mode 1 as shown in FIG. 1, the radiation energy emitted from point Q reaches point P passing through from cell 1 to cell 11.

In the present invention, in addition to a calculation cell of level 0 which is used in a usual calculation, cells having different sizes of level 1, 2, 3, . . . formed by joining plural calculation cells are introduced.

The calculation cells of not less than level 1 can be formed from any combination of the calculation cells having level 0. In the example as shown in FIG. 1, the calculation cells having level 1 are formed by joining 2×2 pieces of the calculation cell having level 0. The calculation cells having level 2 are formed by joining 4×4 pieces of the calculation cells having level 0.

The advantage of the present calculation method is a high efficiency in numerical calculation when cells formed by joining pieces of an nth power of 2 are used. Further, when the location for calculation cells comes near the boundary of the region, it is not necessarily easy to use a calculation cell formed by pieces of 2"×2". In such instance a cell, like cell 1, is taken into account in which a portion beyond the boundary is neglected.

Among calculation methods which enhance efficiency by introducing plural calculation cells of different sizes, there is such as a multi grid method which is similar to the present calculation method in which cells having different number of joint pieces are taken into account.

The cells having levels not less than 1 are used not only for the rays between point Q and point P but also for the ray calculation in other locations. In this manner, if the cells are used in multiple time the calculation efficiency can be enhanced. Further, the cells having the same size, but the locations thereof are offset can be prepared.

As a result of these joints, when selecting a cell, it is possible to select a preferable cell which will be explained later in detail. Further, when cells which are joined only in one direction are used, calculation accuracy can be enhanced without increasing the calculation time.

Now, a method of selecting cells having different levels will be explained. In calculation, any cells between point Q and point P can be selected, if the passing through lengths are the same. However, in view of the calculation efficiency and accuracy thereof, the following selection methods can be conceived.

(1) To select a cell having the highest level among ones which come in the field of view angle covered by the respective rays. When assuming the field of view angle as $\Delta\Omega g$, the level 2 in FIG. 1 corresponds to the above condition. Since the cells near at point P have a large influence to point P, calculation is performed by cells having small level 0. Since the cells near at point Q have small influence to point P, the cells having large level are used. As a result, number of cells used at the location remote from point P is decreased, thereby, the calculation speed is increased.

(2) Even when the above first method is used, a small amount of non-influential cells remains in the calculation region. The remaining cells are white cells existing between the field of view angle $\Delta\Omega g$ as shown in FIG. 1. In order to reduce these cells it is preferable to search a maximum cell in a range larger than the field of view angle. The larger range is provided as a calculation parameter. The larger range has to be set so as not to include adjacent ray. For example, in FIG. 1 when assuming the field of view angle as $\Delta\Omega$, a larger range of $\Delta\Omega g$ is introduced and the largest cell which comes in this range is searched. In FIG. 1, the influential cell is determined in such a manner.

(3) When a cell having high level is used in a location in which variation in physical quantity such as temperature is large, errors sometimes increase. Therefore, in the location where a gradient of the physical quantity is steep, cells having low levels are used based on the methods (1) and (2).

(4) When there are places in the region such as of a physical body and wall which are removed from the calculation, the large cells according to methods (1) through (3) can not be used. In this instance, the cells having low levels are used.

(5) When the calculation cells are fine, it is not necessary to calculate with cells having level 0, cells having level not less than 1 can be selected.

With these methods, when number of the minimum level is designated, the calculation time can be shortened.

Figure 3:
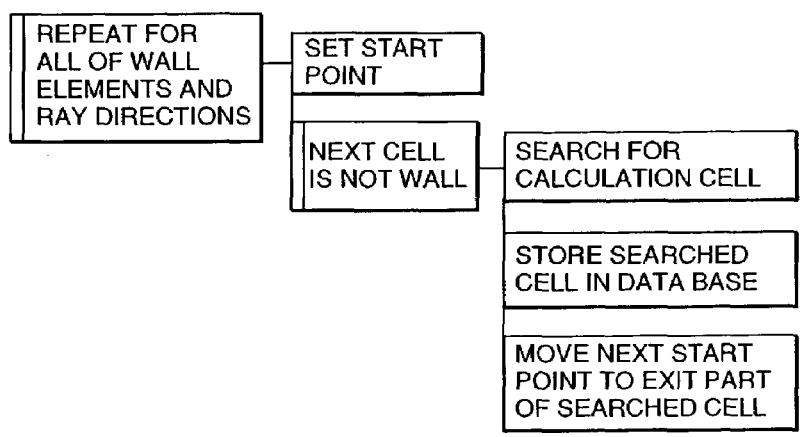
FIGS. 3 is a diagram showing a conventional ray data base preparation algorism and processing steps in radiation transportation calculation method.
Figure 3:
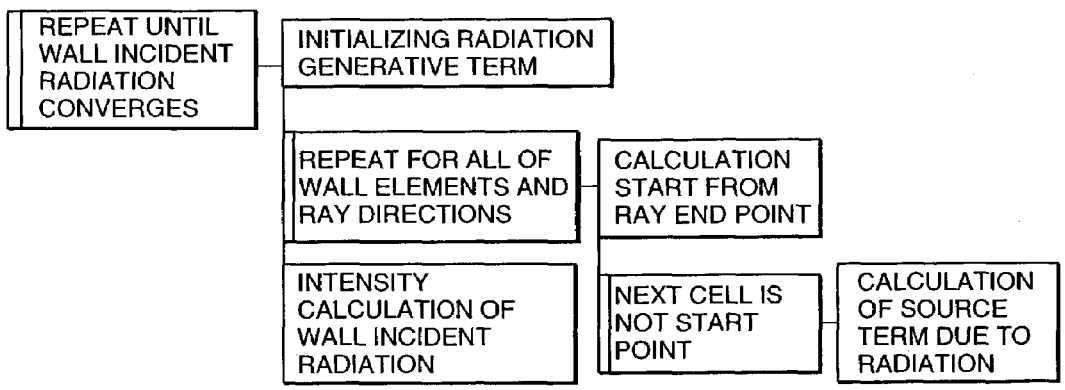

FIG. 3 is a diagram showing a conventional ray data base preparation algorism and processing steps of radiation transport calculation method. Although the present processing steps are based on DT method, the like processing steps can be used in the other radiation calculation method. In DT method, indexes are attached to the cells through which rays pass and are stored as a data base, thereby, the processing is speeded up.

Figure 4:
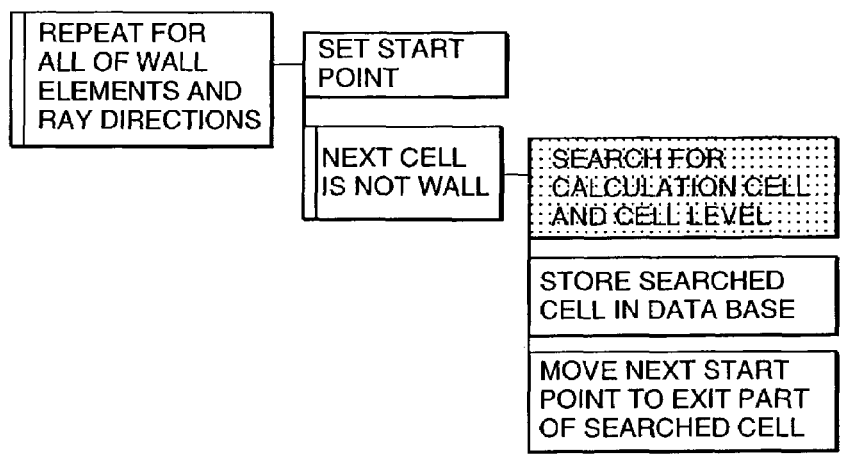
FIG. 4 is a diagram showing a ray data base preparation algorism and processing steps in radiation transportation calculation method according to the present invention.
Figure 4:
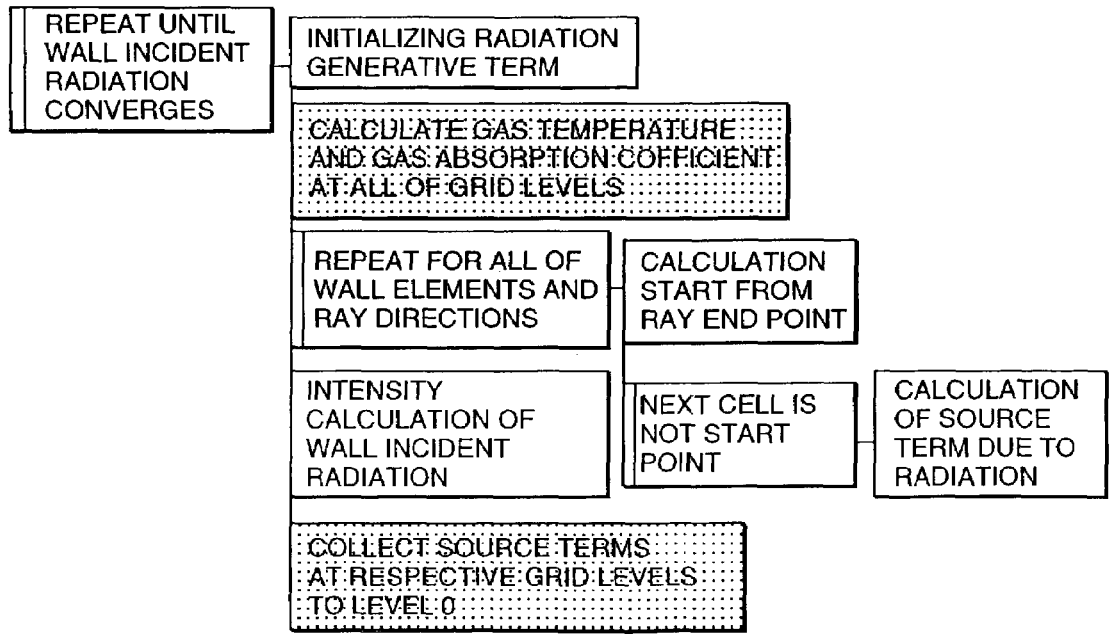

FIG. 4 is a diagram showing a ray data base preparation algorism and processing steps of radiation transport calculation method according to the present invention. In the present invention, likely, indexes are attached to the cells through which rays pass and the same are stored as a data base. In this instance, the feature of the present invention is to select a cell among a variety of cells. The cell selection method was already explained in connection with FIG. 1.

In the present invention, when calculating radiation, if cells having levels not less than 1 are used, it is necessary to set for the cells concerned such as gas temperature and gas absorbing coefficient. Since the gas temperature is used for calculating intensity of radiation, it is preferable to use an average of sum of biquadrate other than an average of simple sum. When volumes are different for every cell, it is necessary to take into account of an influence of the volume. Such as gas absorption coefficient and other parameters used for the radiation calculation are processed by averaging in view of the physical phenomena thereof.

Subsequently, the transportation of radiation energy with regard to all of the wall elements and rays in all of the directions are calculated. Such calculation method can use the conventional radiation calculation method as it is. For the cells having high levels if the radiation transportation is calculated in view of the distribution thereof in the cells, a calculation of high accuracy can be achieved.

When the calculations with regard to all of the wall elements and rays in all of the directions have been completed, the calculation on incident radiation intensity has been completed. Under this condition energy source terms due to radiation are distributed on the calculation cells having respective levels. Therefore, it is necessary to concentrate these source terms to ones having level 0.

A cell having a high level is formed by plural cells having level 0. The most simple method of distributing the energy generating terms to grids having level 0 is a method of distributing the same depending on volume. However, between the cells having level 0 contained in a cell having a high level there is temperature dispersion, therefore, there is also difference in the energy source terms. When an algorism is incorporated which allots the source terms for every cell, the calculation accuracy is enhanced.

Figure 5:
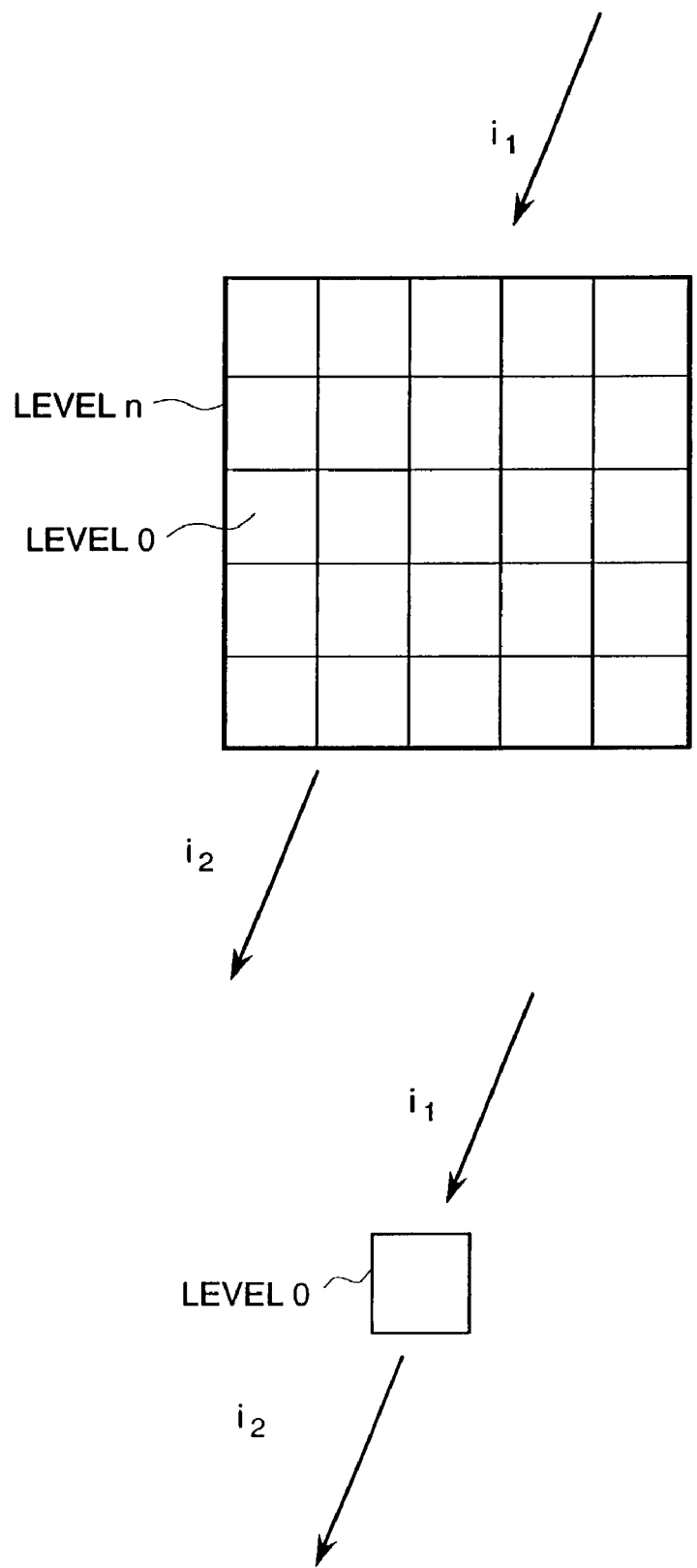
FIG. 5 is a diagram showing a cell having level n which is constituted by plural cells having level 0.

FIG. 5 is a diagram showing a cell having level n which is constituted by plural cells having level 0. As shown in the upper portion of FIG. 5, when a cell having level n is constituted by plural cells having level 0, it is assumed that the intensity of radiation making incident to the cell having level n is as $i_1$. Although the intensity $i_1$ differs depending on radiation directions, however, for the sake of simplicity, as $i_1$ an average incident radiation intensity is used herein.

Although radiation of different intensity makes incident to respective cells having level 0, however, it is assumed that radiation $i_1$ makes incident. Further, although radiation emitted from the respective cells makes incident to the other cells, such is neglected.

Under these assumptions, as shown in the bottom portion of FIG. 5, incident radiation intensity, emitting radiation intensity and the source term represented by the difference thereof are determined for the respective cells.

Based on the sum of the source terms having level 0 distributed from the source terms and determined above and the original source terms having level 0, the rate of the source terms for the respective level 0 is determined.

Finally, through multiplication of the determined source generating rate and the source terms determined with respect to level n, the source terms for the respective cells are calculated.

In the above explanation an instance wherein rays are emitted from a wall was considered, however, in ray tracing method, zone method and Monte Carlo method such as rays and photons are emitted from internal calculation cells.

[Embodiment Mode 2]

Figure 6:
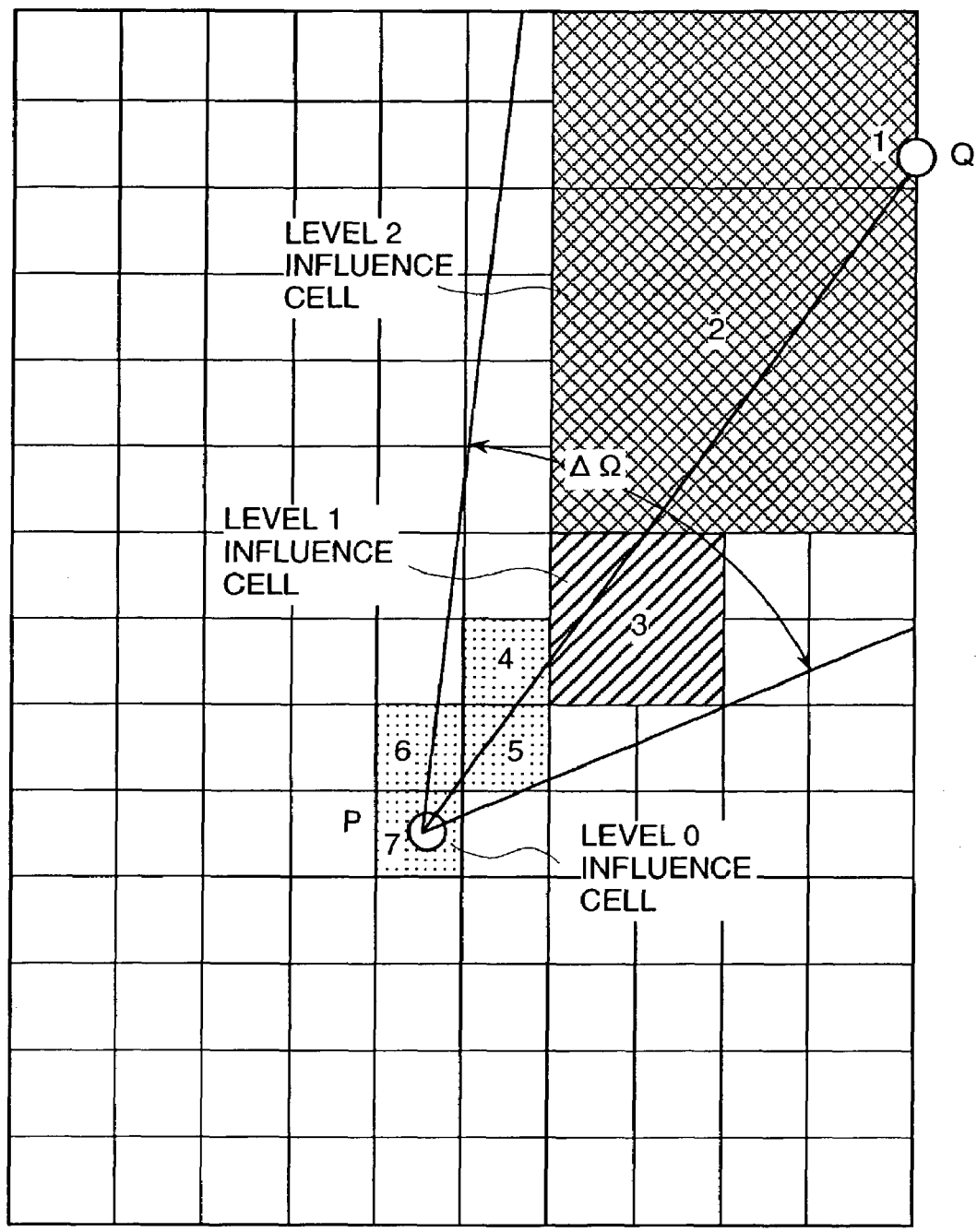
FIG. 6 is a diagram showing a joining manner of radiation elements in an embodiment mode 2 of the radiation calculation method according to the invention.

FIG. 6 is a diagram showing joint manner of radiation elements in the embodiment mode 2 of the radiation calculation method according to the present invention. Namely, the diagram shows cells through which a ray passes in the present embodiment mode 2.

Figure 7:
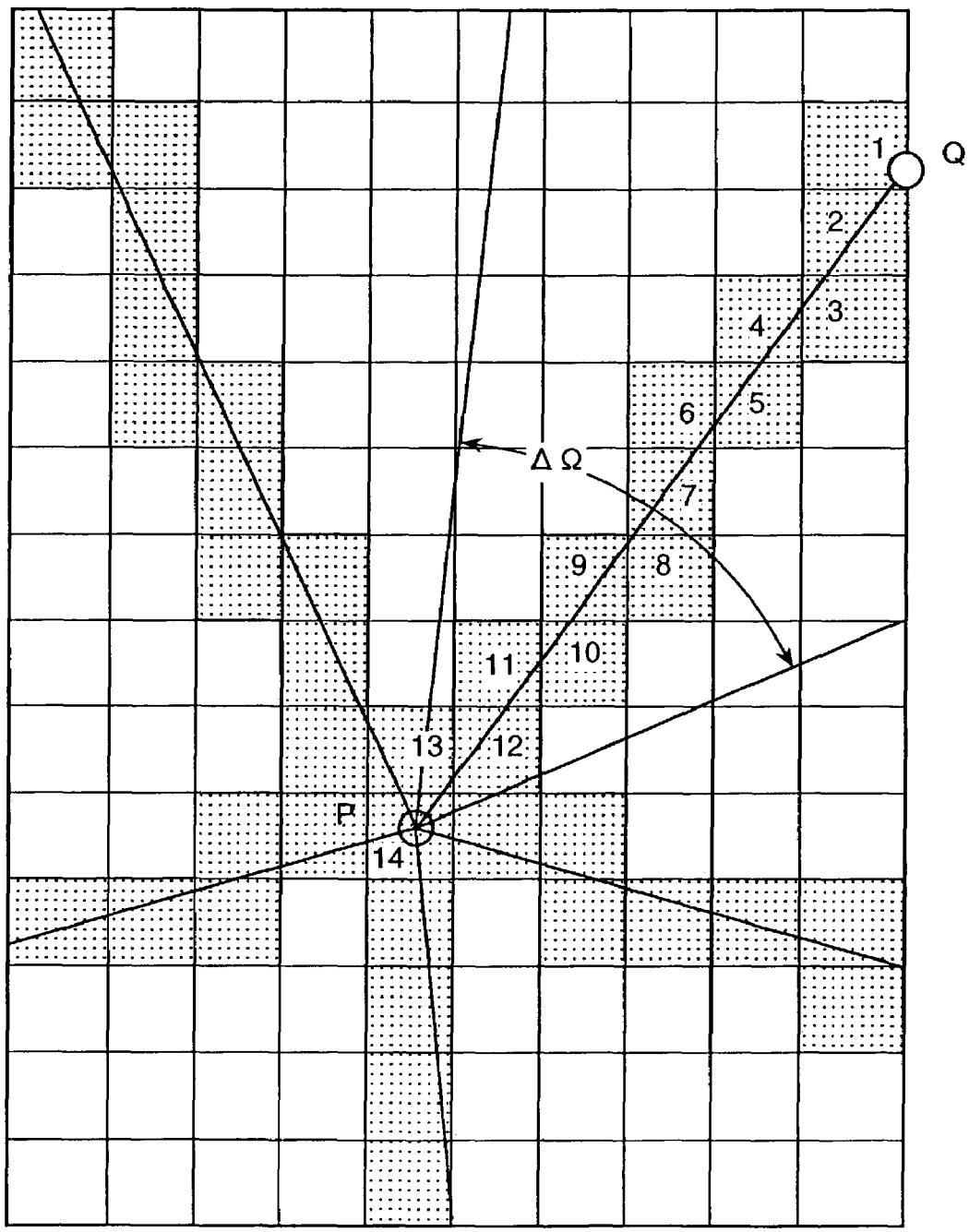
FIG. 7 is a diagram showing cells through which rays pass in a conventional method.

FIG. 7 is a diagram showing cells through which a ray passes in the conventional method. As has already been explained, in the conventional method even at a location remote from the radiation energy generating source P, cells having the same size were used like those at a location near the source. In such instance, many cells with no influence for the calculation are caused at the location remote from point P namely at the location near point Q.

In contract thereto, in the present embodiment mode 2 a large cell is used at the location remote from point P as shown in FIG. 6. In particular, a largest cell which comes into the field of view angle $\Delta\Omega$ is selected.

In the present embodiment mode 2, the number of the passing cells is reduced from 14 pieces to 7 pieces in comparison with the conventional method. Like the instance in which a ray is emitted from a wall, there is freedom with regard to cell selection method.

[Embodiment]

Now, a specific embodiment to which the radiation calculation method is applied will be explained.

Figure 8:
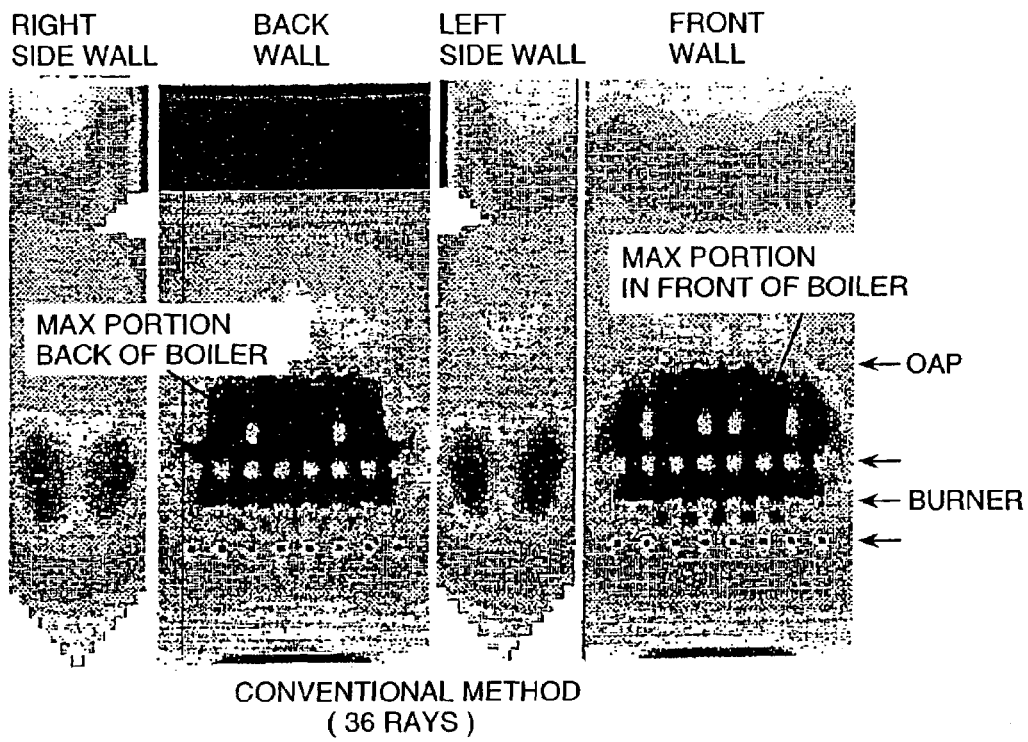
FIG. 8 is a diagram showing a heat absorption distribution calculated according to a conventional method.

FIG. 8 is a diagram showing a heat absorption distribution calculated according to a conventional DT method. The present boiler uses coal as its fuel and is provided with 48 pieces of burners and 16 pieces of OAPs (over firing air ports).

The present example is a result in which heat absorption distribution in a boiler of 1000 MW is calculated. Locations exhibiting the maximum heat absorption at a boiler front water wall and at a boiler rear water wall are also illustrated. Number of rays herein was 36.

Further, as a result of calculation on different number of rays, it was confirmed that no difference was resulted in, if the number of rays is more than 36.

Figure 9:
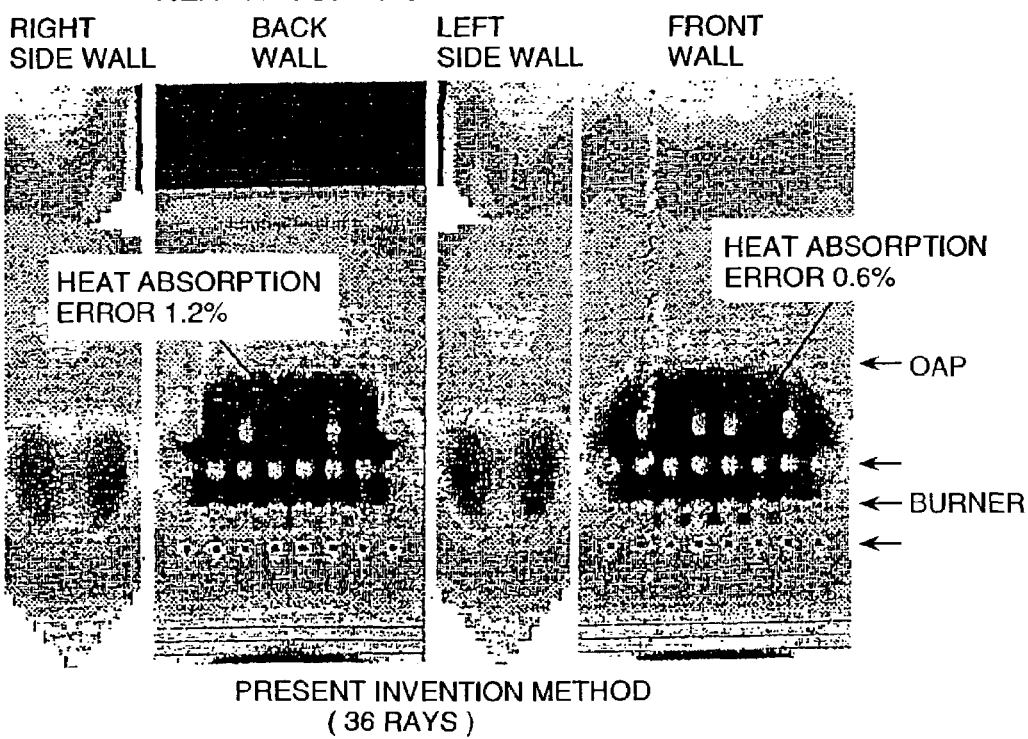
FIG. 9 is a diagram showing a heat absorption distribution calculated according to the radiation calculation method of the present invention.

FIG. 9 is a diagram showing a heat absorption distribution which was calculated based on the radiation calculation method according to the present invention. The present boiler is identical to that in FIG. 8, uses coal as fuel and is provided with burners of 48 pieces and air ports OAP of 16 pieces.

The example of the present embodiment is a result in which heat absorption distribution in a boiler of 1000 MW is calculated. Locations exhibiting the maximum heat absorption at a boiler front water wall and at a boiler rear water wall are also illustrated. Number of rays herein was 36.

As will be apparent from the comparison between FIG. 8 and FIG. 9, the distributions are substantially the same. As the result of calculation error investigation on the maximum heat absorption, the error at the boiler front water wall was 0.6% and the error at the boiler rear water wall was 1.2%. Accordingly, it was confirmed that errors of the radiation calculation method according to the present invention is small.

Figures 10, 11:
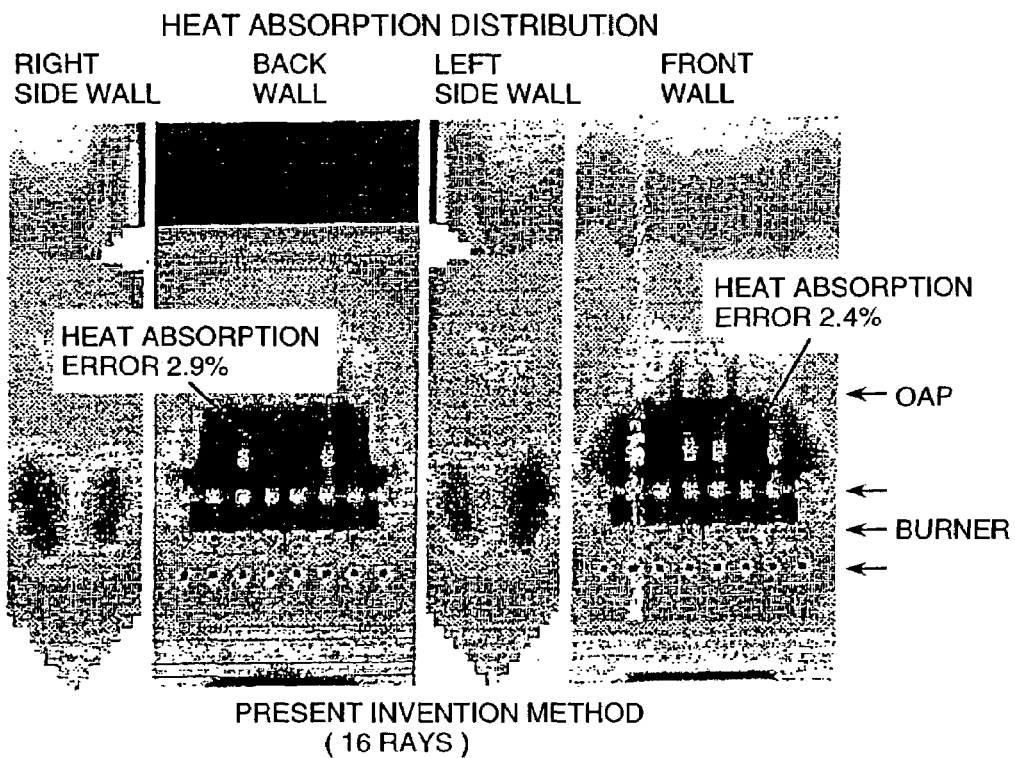
FIG. 10 is a diagram showing a heat absorption distribution calculated according to the radiation calculation method of the present invention while reducing number of rays to 16.
FIG. 11 is a diagram showing the number of ray elements used in the calculations.

FIG. 10 is a diagram showing a heat absorption distribution which was calculated based on the radiation calculation method according to the present invention while reducing the number of rays to 16.

With regard to the distribution, it was confirmed that substantially the same result as with the conventional method is obtained. As the result of calculation error investigation on the maximum heat absorption, the error at the boiler front water wall was 2.4% and the error at the boiler back water wall was 2.9%. Accordingly, it was confirmed that errors of the radiation calculation method according to the present invention is small.

FIG. 11 is a diagram showing the number of ray elements used in this calculation.

In the conventional DT method, only the ray elements having level 0 are included and in the case of number of 36 rays the total number thereof was 8.8 M cells.

On the other hand, according to the present invention in the case of number of 36 rays the total number of ray elements was 6.47 M cells which corresponds to 26% cell number reduction in comparison with the conventional one.

Further, in the case of number of 16 rays according to the present invention the total number of ray elements was 2.06 M cells which amounts up to 77% cell number reduction in comparison with the conventional one. The reason why the calculation accuracy did not decrease even when the ray element number is reduced extremely to the above amount is that the fine cells are used in important locations.

Further, among memories necessary for the radiation calculation there are many memories necessary for storing the ray elements. Namely, when the number of rays is reduced to 16, the amount of necessary memories can be reduced to about ¼.

Figure 12:
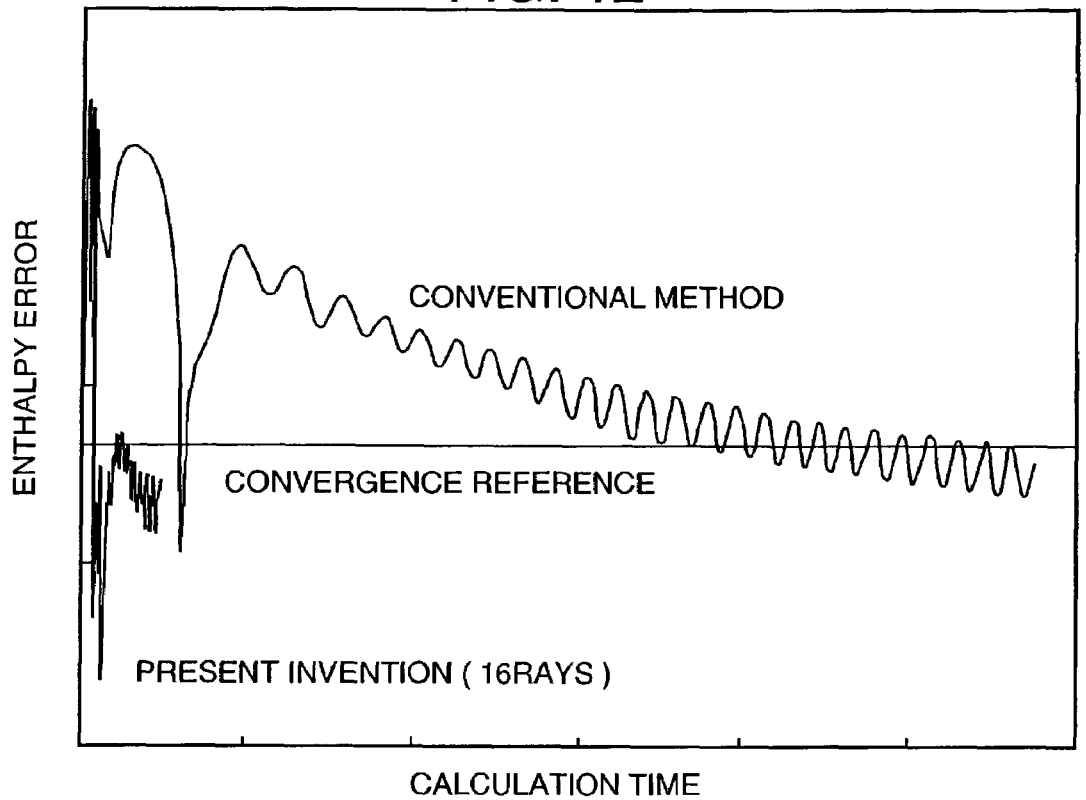
FIG. 12 is a diagram showing a result of calculation time according to a conventional example and an embodiment of the present invention.

FIG. 12 is a diagram showing measurement result of the calculation time according to the conventional example and the embodiment of the present invention. The calculation time was measured on the boiler as shown in FIG. 8 which uses coal as fuel and is provided with burners of 48 pieces and air ports OAP of 16 pieces. The initial value for the calculation was calculated according to FLUX method representing a simplified radiation calculation method. Thereafter, the respective calculations were performed according to the conventional method and the radiation method of the present invention.

The calculation time until the error in enthalpy reduces below a convergence reference can be reduced to about ½₀ in comparison with the conventional method. Since the number of rays is reduced to about ¼, it is presumed that the calculation time will be reduced to about ¼, however, the calculation was speeded up more as presumed.

The reason of the above desirable result is presumed in such a way that in the radiation calculation method of the present invention, since the cells are selected so as to fill up the field of view angle, and number of cells into which source terms are not included is limited, thereby, the distribution of the source terms becomes smooth and the calculation is stabilized.

Figure 13:
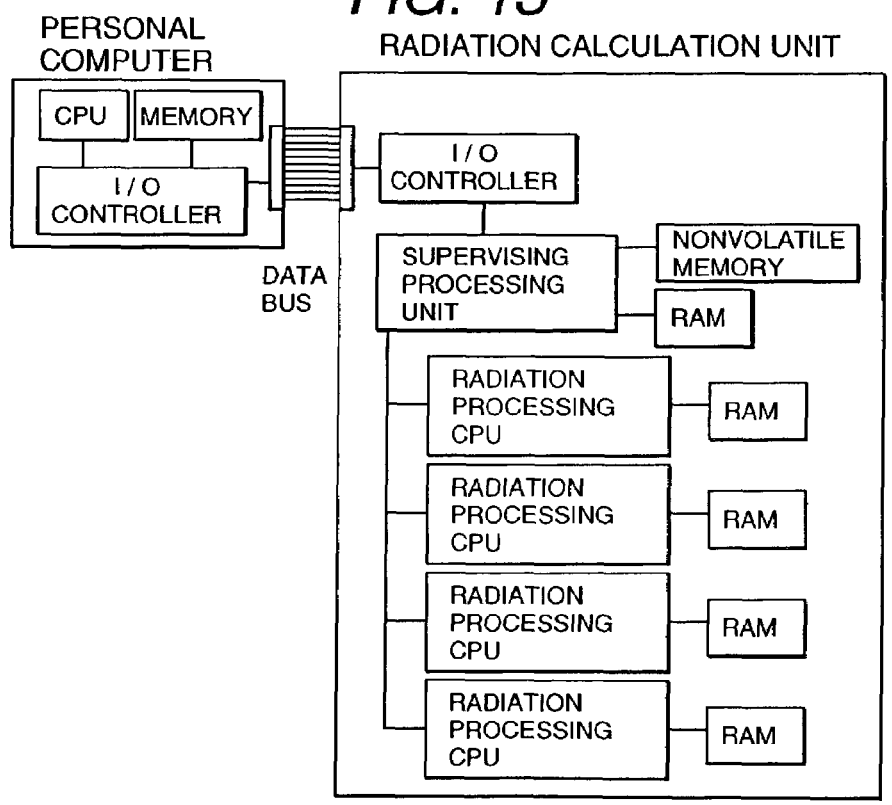
FIG. 13 is a schematic diagram of a system through which the radiation calculation method of the present invention is performed.

The radiation calculation method of the present invention can be performed by any one of a personal computer, a general purpose computer, a vector type computer, and a parallel computer. However, when a dedicated hardware is used, an inexpensive and high speed calculation can be performed. Such example is illustrated in FIG. 13 in which a radiation calculation device is connected to a personal computer. As the connection method in FIG. 13, a data bus such as PCI is used, however, any connection methods which show a comparatively high data transmission speed can be used, such as ETHERNET, USB and SCSI. In the radiation calculation device a supervising processing unit and plural radiation processing CPUs are provided. The supervising processing unit transfers data to the radiation processing CPUs based on data transmitted from the personal computer and distributes the processing thereof, and further, after completing the calculation, performs the processing of transferring the result to the personal computer. To the supervising processing unit a nonvolatile memory and a RAM are connected. In the nonvolatile memory, programs for the supervising processing unit and the radiation processing CPUs are stored. When starting up the radiation calculation unit, programs read from the nonvolatile memory are stored in the respective processing units. The RAM belonging to the supervising processing unit is primarily used for storing data, in that data necessary for the radiation calculation such as temperature, nature and state of gas, gas absorption coefficient, and analysis mesh are stored. When a problem to be solved is transmitted from the personal computer, the supervising processing unit transfers data necessary for the calculation to the respective radiation processing CPUs. Although FIG. 13 illustrates four radiation processing units, however, more the number thereof, the higher is the processing speed thereof. Further, if all of the calculation is assigned to the supervising processing unit, the radiation processing units can be eliminated. The radiation calculation can be performed in parallel for the respective rays, when the supervising unit distributes the calculation for rays to the respective radiation processing CPUs, the respective radiation processing CPUs perform the radiation calculation to calculate the energy source terms of the respective radiation elements and the heat absorption distribution of the walls. When all of the processings have been completed, the supervising processing unit collects the result stored in the RAMs connected to the respective processing CPUs. Two methods of distributing processings by the supervising processing unit are conceived. One is to distribute all of the calculations at the beginning. However, if there arise differences in processing times between respective radiation processing CPUs, there appears a radiation processing CPU which performs no processing. Therefore, it is preferable to assign one process to one of the radiation processing CPUs, then to seek another radiation processing CPU which performs no processing to assign another processing. Thereby, the processings are substantially uniformly assigned to all of the radiation processing CPUs. When the respective radiation processing CPUs have respective RAMs for calculation use, a high speed calculation can be performed. However, a single common RAM can be provided for all of the radiation processing CPUs and the supervising processing unit. In this instance, since access to the RAM from all of the CPUs may be concentrated, it is effective to use a high speed memory which uses cross bar switches.

Figure 14:
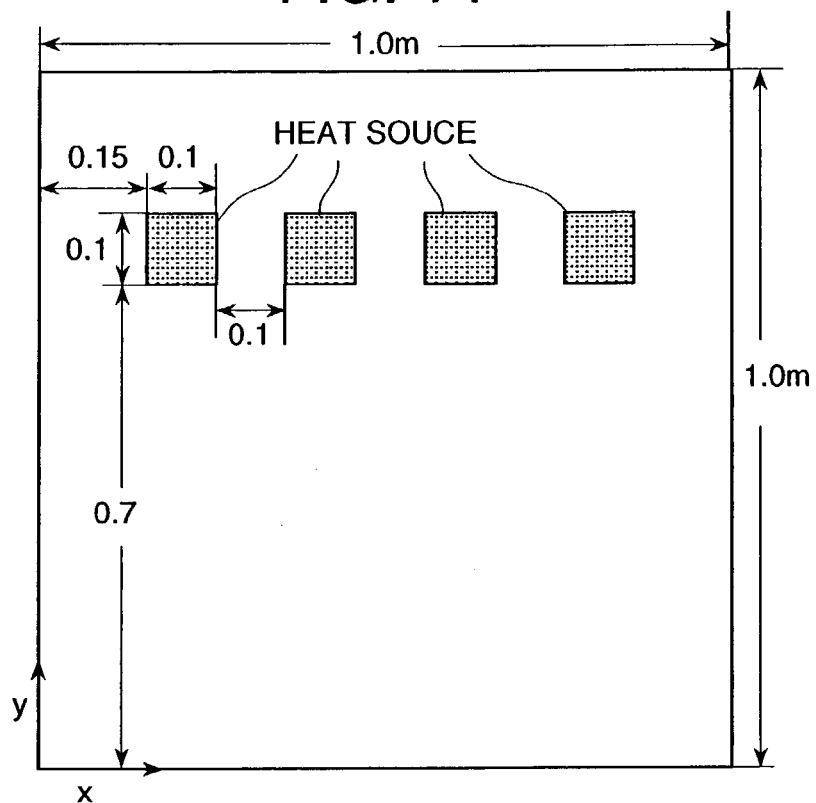
FIG. 14 is a diagram showing an example in which the present invention is applied to two dimensional radiation calculation through combination with DT method.

Now, an example, in which the present invention is combined with DT method and is applied to a two dimensional radiation calculation, will be explained. FIG. 14 shows the calculation system, in which it is assumed that four heat generating bodies exist in a square region and around the boundary of the square region a black body having temperature of 0° K. surrounds, the radiation emitted from the heat generating bodies is absorbed by the intermediate space and the boundary of the square region. When assuming that the length of one side of the square region is 1.0 m, the length of one side of one of the heat generating bodies is determined as 0.1 m. The heat generating body at the most left side is set at the position spaced apart by 0.15 m from the side face of the square region. The interval between the heat generating bodies was 0.1 m. The heat generating bodies were located at positions spaced apart by 0.7 m from the bottom face of the square region. The gas absorption coefficient Ra within the square region was assumed as 1.0(1/m). Further, the heat generating amount S was assumed as 1.0 KW/m$^3$. Still further, the mesh used was divided into 20 parts in X and Y directions.

Figure 15:
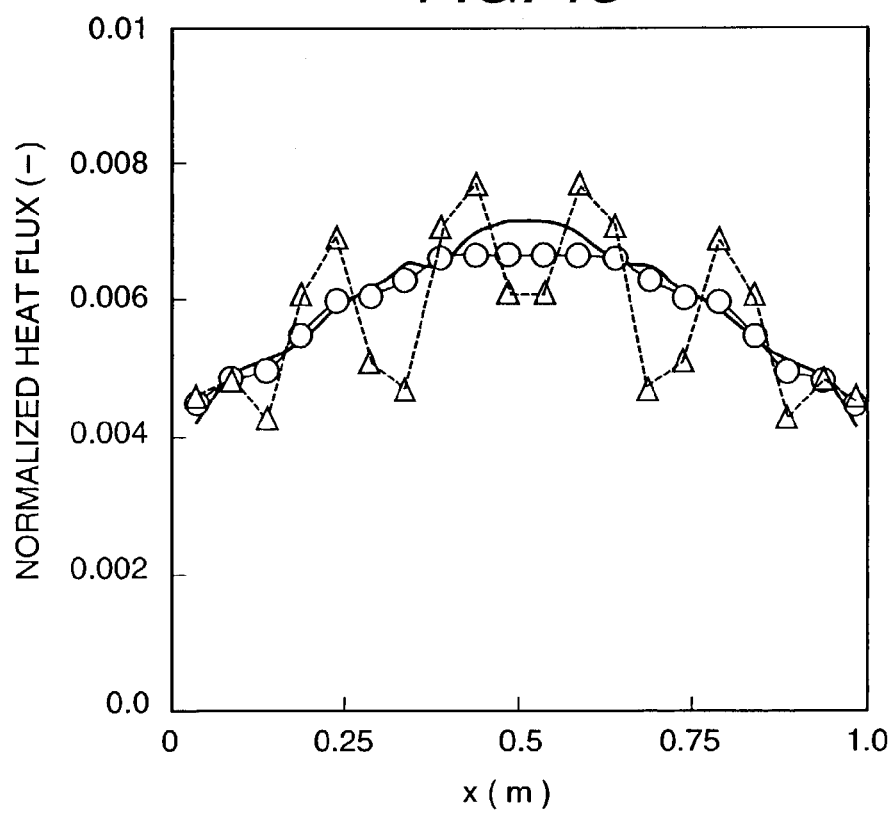
FIG. 15 is a diagram showing a calculation result by FIG. 14 example.

FIG. 15 shows the result of the above model. The abscissa is the bottom face position X, and the ordinate is normalized heat flux at the bottom face. The normalized heat flux is calculated from heat flux q according to the following equation;

$$\text{Normalized Heat Flux} = q(W/m^2) * Ra(1/m)/S(W/m^3)$$

The bold solid line shows the result, when one wall element emits number of 400 rays, it is confirmed that even if number of rays is increased more than 400 rays, the calculation result does not change. The dotted line connecting triangles shows the calculation result obtained by the DT method, when one wall element emits number of 36 rays. In this instance, the calculation result oscillates, in that partly high and partly low, which is understood caused by ray effect. The fine solid line connecting circles shows the calculation result according to the present invention, when one wall element emits number of 36 rays. The calculation result shows no oscillation, which substantially coincides with the calculation result when number of rays is 400. In the case of conventional method in which number of rays is 36, the number of cells through which rays pass was 58842. On the other hand, according to the present invention the number of cells through which rays pass decreases to 39528, in that the number of cells can be reduced by 33%. Further, according to the method of the present invention the number of cells through which rays pass is reduced as well as the calculation accuracy is enhanced.

According to the present invention, a radiation calculation method is obtained in which near at a calculation cell from which radiation energy is emitted or at a calculation cell P into which radiation energy is absorbed, a small (level 0) cell is used and at a remote location from the calculation cell P, a large (level n) cell formed by combining plural small cells is used. Further, a largest calculation cell which comes into field of view angle $\Delta\Omega$ covered by a ray is selected. As a result, the accuracy of the radiation calculation is enhanced, the calculation time is shortened and amount of memory necessary for the calculation can be reduced.

The invention claimed is:

1. A method for determining distribution and intensity of radiation emitted from an energy source as radiation rays, comprising the steps of:
    defining plural radiation elements to represent a field where radiation energy transfer is caused by the energy source, wherein the field is divided into the plural radiation elements and wherein the plural radiation elements each have a proximity to one of the energy source or an absorption point and each comprises at least one of a space cell, a wall element and a boundary element;
    forming joint elements in such a manner that as the position of a joint element becomes distant from said absorption point, a joint element having an increased joint number of said radiation elements is formed with respect to a joint element close to said absorption point; and
    determining radiation energy of said respective radiation elements by distributing the radiation energy absorbed by the joint elements.

2. The method according to claim 1, wherein the number of radiation elements in each joint element is determined depending on a relationship between a region of a field of view angle covered by one of the radiation rays, and the location of the radiation elements and the size thereof.

3. The method according to claim 2, wherein the number of the radiation elements in each joint element is selected based on a largest possible area which comes in the field of view angle covered by the one radiation ray.

4. The method according to claim 2, wherein the number of the radiation elements in each joint element is determined so that the radiation elements, through which the radiation rays pass cover an entire region receiving the emitted radiation.

5. The method according to any one of claims 1 to 4, wherein the discrete transfer method is applied for the step of determining energy exchange.

6. The method according to any one of claims 1 to 4, wherein the ray tracing method is applied for the step of determining energy exchange.

7. The method according to any one of claims 1 to 4, wherein the Monte Carlo method is applied for the step of determining energy exchange.

8. The method according to any one of claims 1 to 4, wherein the zone method is applied for the step of determining energy exchange.

9. The computer readable medium having stored thereon computer executable instructions for determining distribution and intensity of radiation emitted from an energy source, the computer executable instructions comprising:
    defining plural radiation elements to represent a field where radiation energy transfer is caused by the energy source, wherein the field is divided into the plural radiation elements and wherein the plural radiation elements each have a proximity to one of the energy source or an absorption point and each comprises at least one of a space cell, a wall element and a boundary element;
    forming joint elements in such a manner that as the position of a joint element becomes distant from said absorption point, a joint element having an increased joint number of said radiation elements is formed with respect to a joint element close to said absorption point; and
    determining radiation energy of said respective radiation elements by distributing the radiation energy absorbed by the joint elements.

10. A computer system for determining distribution and intensity of radiation emitted from an energy source comprising:
    means for defining plural radiation elements to represent a field where radiation energy transfer is caused by the energy source, wherein the field is divided into the plural radiation elements and wherein the plural radiation elements each have a proximity to one of the energy source and an absorption point and each comprises at least one of a space cell, a wall element and a boundary element;
    means for forming joint elements in such a manner that as the position of a joint element becomes distant from said absorption point, a joint element having an increased joint number of said radiation elements is formed with respect to a joint element close to said absorption point; and
    means for determining radiation energy of said respective radiation elements by distributing the radiation energy absorbed by the joint elements.

* * * * *